US011288826B1

United States Patent
Lato et al.

(10) Patent No.: US 11,288,826 B1
(45) Date of Patent: Mar. 29, 2022

(54) SYSTEMS AND METHODS FOR EVALUATING CHANGES IN TERRAIN TOPOGRAPHY OVER TIME

(71) Applicant: BGC Engineering Inc., Vancouver (CA)

(72) Inventors: Matthew Lato, Ottawa (CA); Alex Ferrier, North Vancouver (CA)

(73) Assignee: BGC ENGINEERING INC., Vancouver (CA)

( * ) Notice: Subject to any disclaimer, the term of this patent is extended or adjusted under 35 U.S.C. 154(b) by 0 days.

(21) Appl. No.: 17/371,337

(22) Filed: Jul. 9, 2021

(51) Int. Cl.
| | |
|---|---|
| G06T 15/00 | (2011.01) |
| G06T 7/55 | (2017.01) |
| G06T 1/20 | (2006.01) |
| G06T 7/33 | (2017.01) |
| G06T 19/20 | (2011.01) |
| G06T 3/40 | (2006.01) |
| G01S 17/89 | (2020.01) |

(52) U.S. Cl.
CPC .......... G06T 7/55 (2017.01); G06T 1/20 (2013.01); G06T 3/40 (2013.01); G06T 7/33 (2017.01); G06T 19/20 (2013.01); G01S 17/89 (2013.01); G06T 2207/10028 (2013.01); G06T 2219/2004 (2013.01)

(58) Field of Classification Search
CPC ......... G06T 19/00; G06T 17/20; G06T 17/00; G06T 15/10; G06T 15/00

USPC ........................................................ 345/419
See application file for complete search history.

(56) References Cited

U.S. PATENT DOCUMENTS

| | | | |
|---|---|---|---|
| 9,619,691 B2 | 4/2017 | Pang et al. | |
| 10,475,231 B2 | 11/2019 | Bhowmick et al. | |
| 10,769,840 B2 | 9/2020 | Kulkarni et al. | |
| 10,921,817 B1 * | 2/2021 | Kangaspunta | G01S 17/931 |
| 2009/0115779 A1 * | 5/2009 | Shulman | G01B 11/2513 |
| | | | 345/419 |
| 2020/0363202 A1 * | 11/2020 | Metzler | G06K 9/00664 |

* cited by examiner

*Primary Examiner* — Gordon G Liu
(74) *Attorney, Agent, or Firm* — Bereskin & Parr LLP

(57) ABSTRACT

Systems and methods for evaluating changes in terrain topography over time are provided. A first point cloud corresponds to the terrain topography during a first time period. A second point cloud corresponds to the terrain topography during a second time period. One or more processors collectively execute instructions to: for each point in the first point cloud, determine a point plane; align the first and second point clouds based on a plurality of plane offset distances; for each point in the aligned second point cloud, calculate a normal direction; for each point in the aligned second point cloud, identify one or more corresponding points in the aligned first point cloud; and generate a third point cloud representing topographical differences. The first point cloud can be divided into a plurality of grid cells and a plurality of graphics processing cores can execute parallel point processing based on the plurality of grid cells.

20 Claims, 11 Drawing Sheets

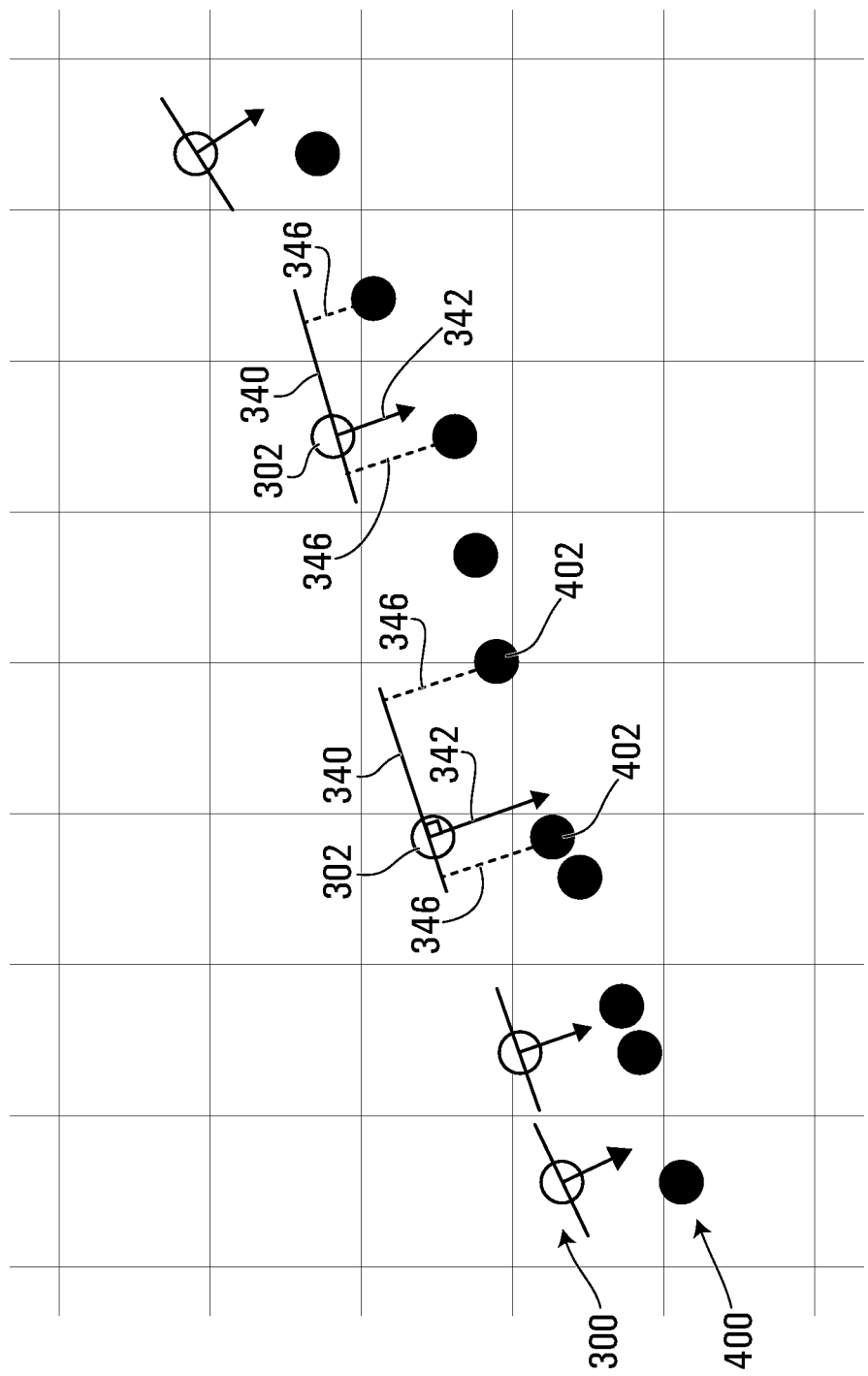

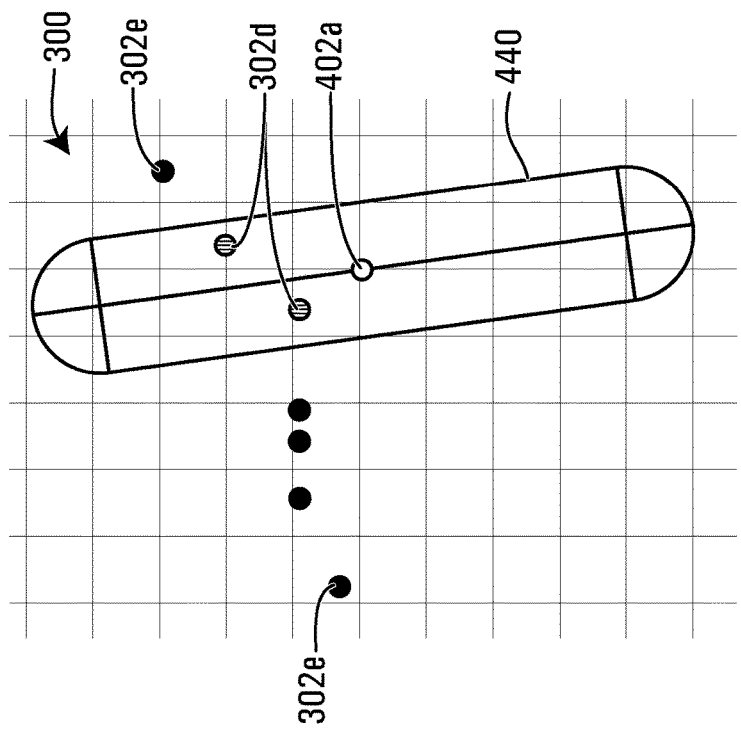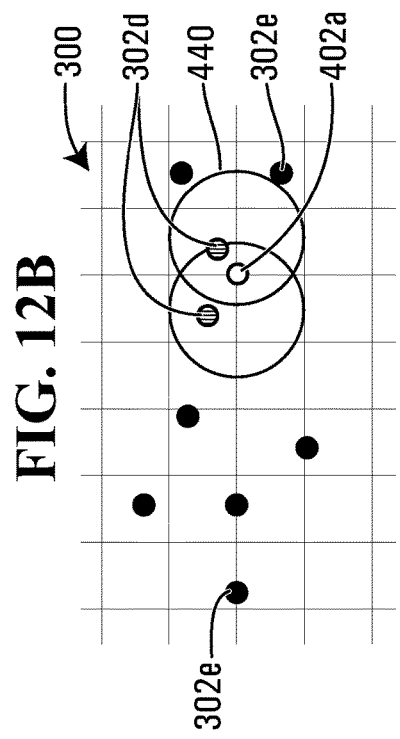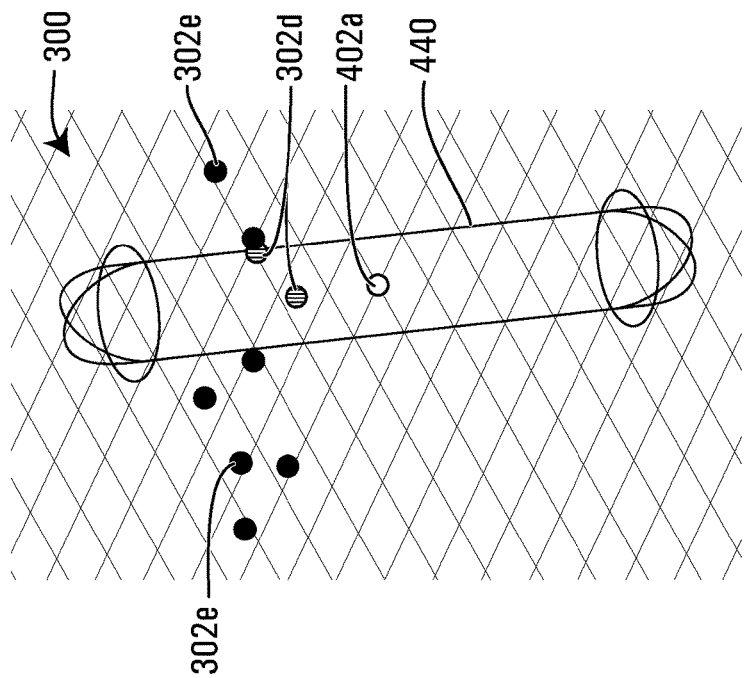

SYSTEMS AND METHODS FOR EVALUATING CHANGES IN TERRAIN TOPOGRAPHY OVER TIME

FIELD

The described embodiments generally relate to processing point clouds, and, in particular, to evaluating changes in terrain topography over time.

BACKGROUND

The following is not an admission that anything discussed below is part of the prior art or part of the common general knowledge of a person skilled in the art.

A point cloud is a set of points in a three-dimensional space. Each point represents a position in the space, and can be defined by a set of coordinates, such as a set of Cartesian coordinates. Computers can use point clouds to represent three-dimensional shapes or objects. For example, point clouds can be used to represent terrain topographies detailing features of the Earth's surface.

Point clouds that represent terrain topographies can be very large and include many points. For example, a point cloud of a terrain topography generated by aerial LIDAR (Light Detection and Ranging) may contain millions, billions, or even trillions of points, representing thousands of square kilometers. Over time, topographical point clouds have increased in size as the resolution of measurement systems has improved. However, conventional computer-implemented methods have struggled to efficiently process these increasingly large point clouds. Such methods have typically required powerful computer systems to provide sufficient processing power.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a method for evaluating changes in terrain topography over time using one or more processors. The one or more processors include one or more graphics processing units (GPU). The one or more GPUs include a plurality of graphics processing cores. A first point cloud corresponds to the terrain topography during a first time period and a second point cloud corresponds to the terrain topography during a second time period. The first point cloud and the second point cloud each include a plurality of points. Each point represents a three-dimensional position on the terrain topography. The method involves the one or more processors collectively executing instructions to: divide the first point cloud into a plurality of grid cells, each grid cell containing one or more points of the first point cloud; for each point in the first point cloud, determine a point plane based on that point and one or more points in the first point cloud adjacent to that point; measure a plurality of plane offset distances, the plurality of plane offset distances including, for each point in the first point cloud, one or more plane offset distances measured between the point plane corresponding to that point and one or more points in the second point cloud; align the first and second point clouds based on the plurality of plane offset distances; for each point in the second point cloud, calculate a normal direction based on that point and one or more points in the second point cloud adjacent to that point; for each point in the aligned second point cloud, identify one or more corresponding points in the aligned first point cloud, the one or more corresponding points being located within a volume projected in the normal direction of that point; and generate a third point cloud including a third plurality of points corresponding to topographical differences between positions of corresponding points in the aligned first and second point clouds. The plurality of graphics processing cores execute parallel point processing based on the plurality of grid cells in at least one of said determining and said identifying steps.

In accordance with a broad aspect, there is provided a computer readable medium having instructions stored thereon collectively executable by one or more processors to implement the method.

In accordance with a broad aspect, there is provided a system for evaluating changes in terrain topography over time. The system includes: one or more data storages and one or more processors. The one or more data storages collectively store a first point cloud and a second point cloud. The first point cloud corresponds to the terrain topography during a first time period and the second point cloud corresponds to the terrain topography during a second time period. The first point cloud and the second point cloud each include a plurality of points. Each point represents a three-dimensional position on the terrain topography. The one or more processors are in electronic communication with the one or more data storages. The one or more processors include one or more graphics processing units (GPU). The one or more GPUs include a plurality of graphics processing cores. The one or more processors collectively execute instructions to: divide the first point cloud into a plurality of grid cells, each grid cell containing one or more points of the first point cloud; for each point in the first point cloud, determine a point plane based on that point and one or more points in the first point cloud adjacent to that point; measure a plurality of plane offset distances, the plurality of plane offset distances including, for each point in the first point cloud, one or more plane offset distances measured between the point plane corresponding to that point and one or more points in the second point cloud; align the first and second point clouds based on the plurality of plane offset distances; for each point in the second point cloud, calculate a normal direction based on that point and one or more points in the second point cloud adjacent to that point; for each point in the aligned second point cloud, identify one or more corresponding points in the aligned first point cloud, the one or more corresponding points being located within a volume projected in the normal direction of that point; and generate a third point cloud including a third plurality of points corresponding to topographical differences between positions of corresponding points in the aligned first and second point clouds. The plurality of graphics processing cores execute parallel point processing based on the plurality of grid cells in at least one of said determining and said identifying steps.

In accordance with a broad aspect, there is provided a method for evaluating changes in terrain topography over time. A first point cloud corresponds to the terrain topography during a first time period and a second point cloud corresponds to the terrain topography during a second time period. The first point cloud and the second point cloud each include a plurality of points. Each point represents a three-dimensional position on the terrain topography. The method involves one or more processors collectively executing instructions to: divide the first point cloud into a plurality of grid cells, each grid cell containing one or more points of the first point cloud; for each point in the first point cloud, determine a point plane based on that point and one or more points in the first point cloud adjacent to that point; measure a plurality of plane offset distances, the plurality of plane offset distances including, for each point in the first point cloud, one or more plane offset distances measured between the point plane corresponding to that point and one or more points in the second point cloud; align the first and second point clouds based on the plurality of plane offset distances; for each point in the second point cloud, calculate a normal direction based on that point and one or more points in the second point cloud adjacent to that point; for each point in the aligned second point cloud, identify one or more corresponding points in the aligned first point cloud, the one or more corresponding points being located within a volume projected in the normal direction of that point; and generate a third point cloud including a third plurality of points corresponding to topographical differences between positions of corresponding points in the aligned first and second point clouds.

In accordance with a broad aspect, there is provided a computer readable medium having instructions stored thereon collectively executable by one or more processors to implement the method.

In accordance with a broad aspect, there is provided a system for evaluating changes in terrain topography over time. The system includes: one or more data storages and one or more processors. The one or more data storages collectively store a first point cloud and a second point cloud. The first point cloud corresponds to the terrain topography during a first time period and the second point cloud corresponds to the terrain topography during a second time period. The first point cloud and the second point cloud each include a plurality of points. Each point represents a three-dimensional position on the terrain topography. The one or more processors are in electronic communication with the one or more data storages. The one or more processors collectively execute instructions to: divide the first point cloud into a plurality of grid cells, each grid cell containing one or more points of the first point cloud; for each point in the first point cloud, determine a point plane based on that point and one or more points in the first point cloud adjacent to that point; measure a plurality of plane offset distances, the plurality of plane offset distances including, for each point in the first point cloud, one or more plane offset distances measured between the point plane corresponding to that point and one or more points in the second point cloud; align the first and second point clouds based on the plurality of plane offset distances; for each point in the second point cloud, calculate a normal direction based on that point and one or more points in the second point cloud adjacent to that point; for each point in the aligned second point cloud, identify one or more corresponding points in the aligned first point cloud, the one or more corresponding points being located within a volume projected in the normal direction of that point; and generate a third point cloud including a third plurality of points corresponding to topographical differences between positions of corresponding points in the aligned first and second point clouds.

BRIEF DESCRIPTION OF THE DRAWINGS

Several embodiments will be described in detail with reference to the drawings, in which:

FIG. 10 is a side view of the portion of the first point cloud shown in FIG. 9 and a portion of the second point cloud shown in FIG. 4, in accordance with an embodiment;

FIGS. 12A, 12B, and 12C are perspective, side, and top views of the volume shown in FIGS. 11A and 11B and a portion of the aligned first point cloud shown in FIG. 5, in accordance with an embodiment.

Figure 1:
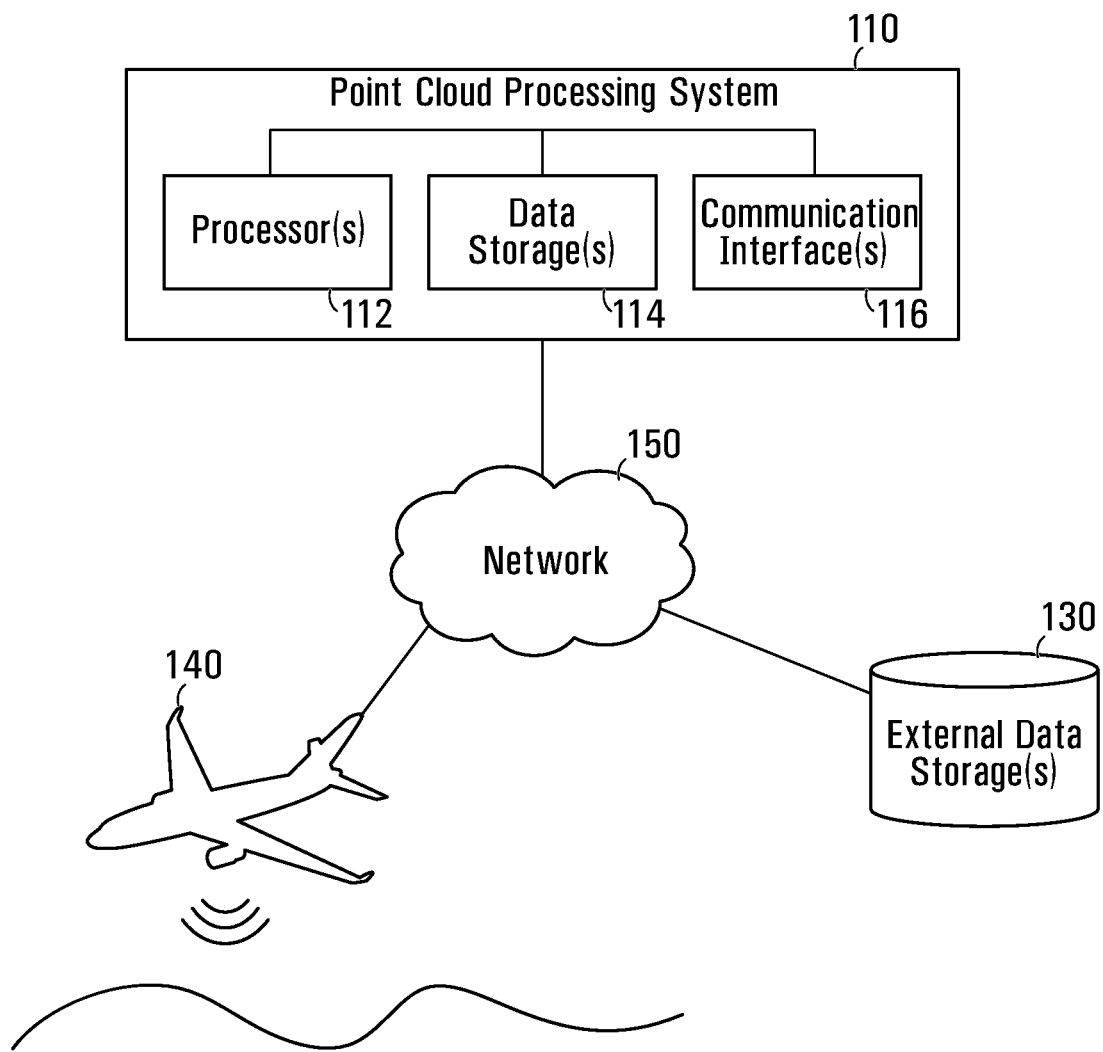
FIG. 1 is a block diagram of components interacting with an example system for evaluating changes in terrain topography over time, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example system 110 for evaluating changes in terrain topography over time. The terrain topography evaluation system 110 can generally be operable to compare two point clouds representing the same terrain topography during two different time periods to detect changes in the terrain topography over time. The two point clouds are generally referred to herein as first and second point clouds. The first point cloud corresponds to the terrain topography during a first time period and the second point cloud corresponds to the terrain topography during a second time period. Evaluating changes in the terrain topography using point clouds can be more effective for complex three-dimensional features and steep vertical slopes as compared to conventional mesh or 2.5D approaches.

Figure 3:
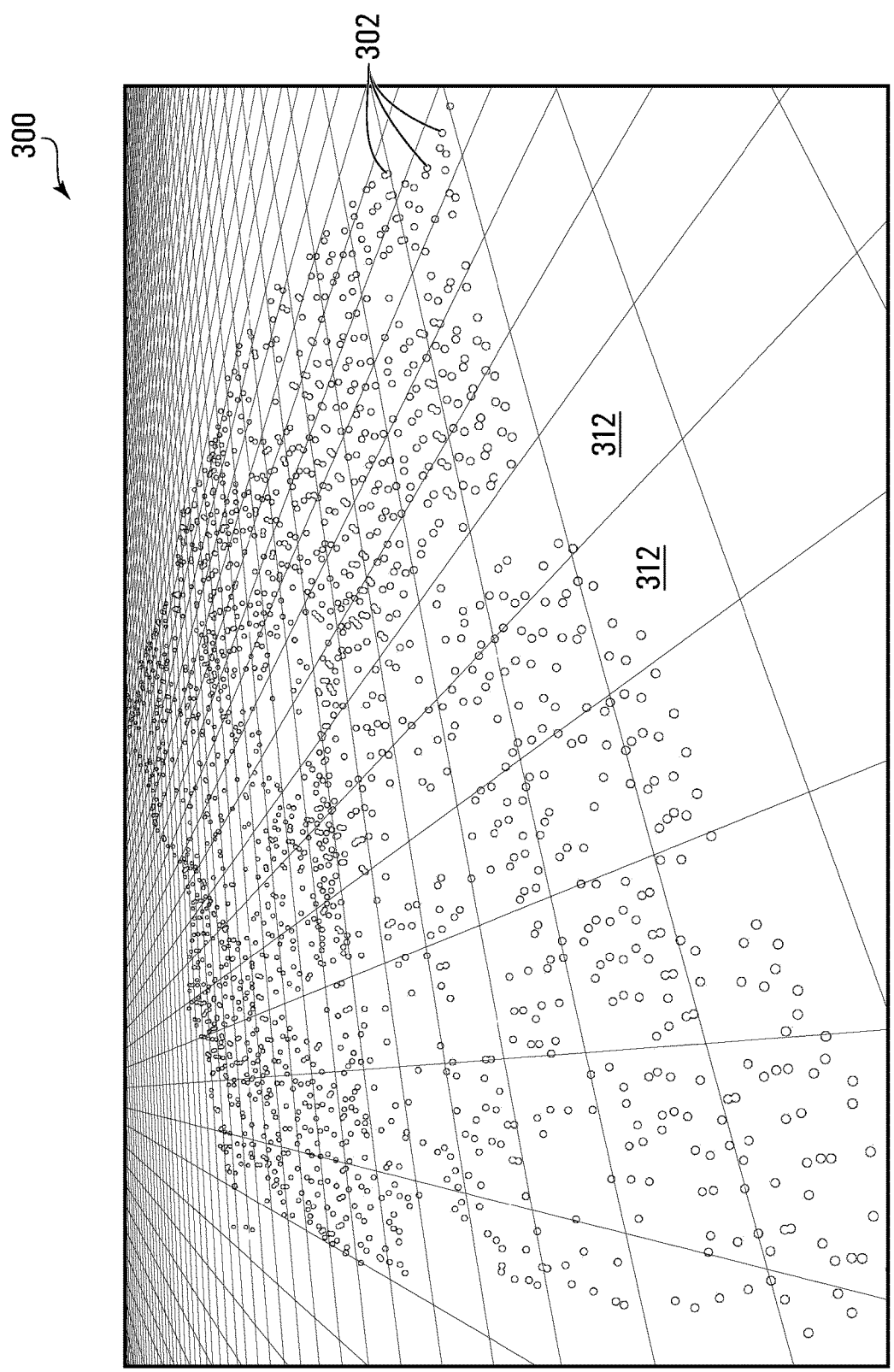
FIG. 3 is a perspective view of an example first point cloud corresponding to a terrain topography during a first time, in accordance with an embodiment.
Figure 4:
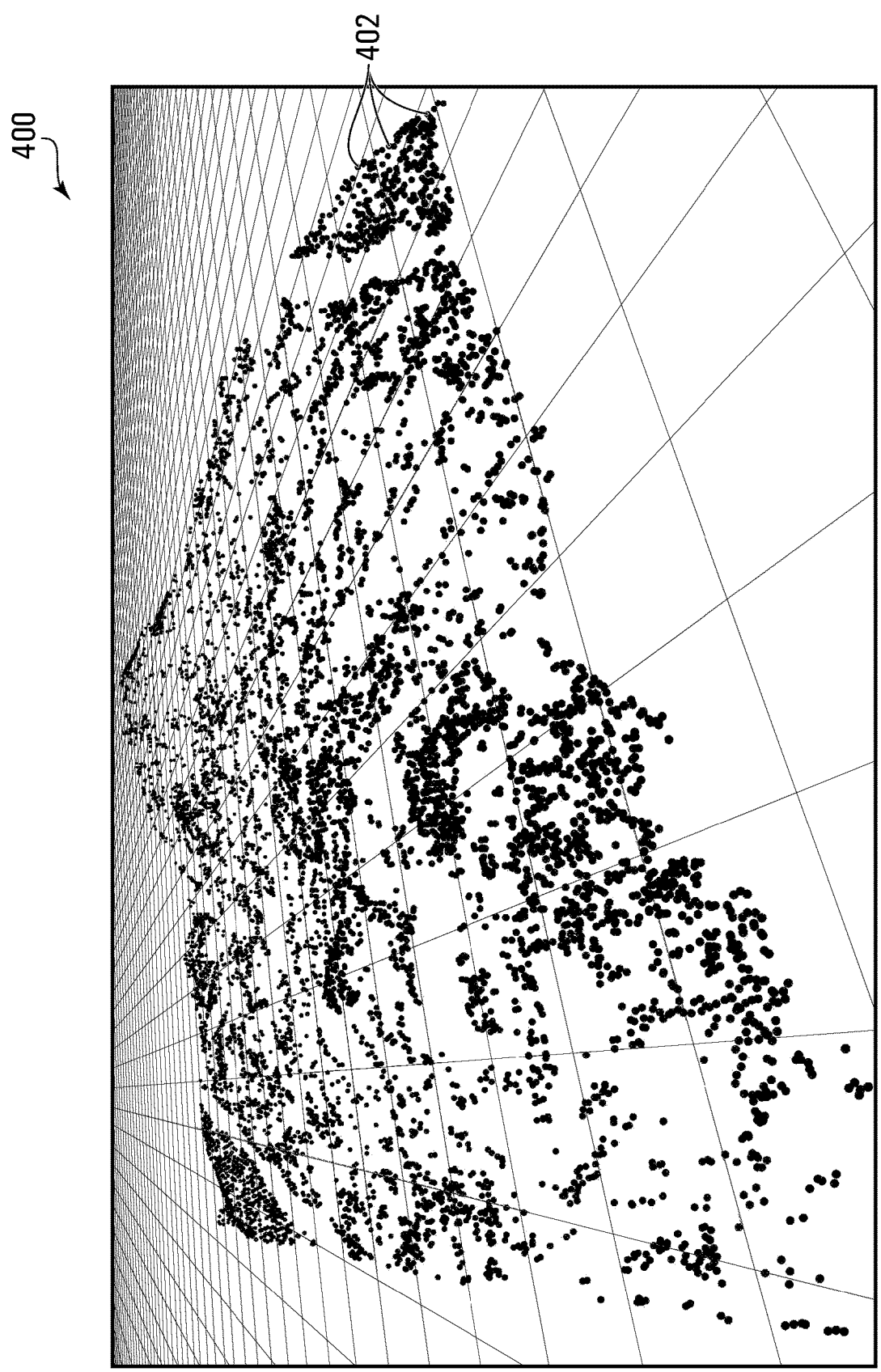
FIG. 4 is a perspective view of an example second point cloud corresponding to the terrain topography shown in FIG. 3 during a second time, in accordance with an embodiment.

Referring to FIGS. 3 and 4, there is shown example first and second point clouds 300, 400 that can be evaluated by the terrain topography evaluation system 110. As shown, the first and second point clouds 300, 400 each include a plurality of points 302, 402. Each point 302, 402 represents a three-dimensional position on the terrain topography. Each point can be defined using a set of coordinates, such as a set of Cartesian coordinates.

As shown, there are differences in the terrain topography represented by the second point cloud 400 as compared to the first point cloud 300. These differences can include changes in the terrain topography over time, for example, due to geological processes, such as erosion, weathering, deposition, etc., and/or human processes, such as excavation, demolition, construction, etc. In some cases, the differences between the first and second point clouds 300, 400 may be relatively small and therefore may be difficult to visually discern. In some cases, different platforms of collection (e.g., plane, UAV (Unmanned Aerial Vehicle), helicopter, etc.) may also impact the quality and density of the data.

In the illustrated example, the second point cloud 400 represents the terrain topography during a subsequent time period as compared to the first point cloud 300. As shown, the second point cloud 400 also includes a greater number of points 402 per fixed area (i.e., density) as compared to the first point cloud 300. However, it should be understood that the terrain topography evaluation system 110 can also be used to evaluate point clouds having similar or the same densities. Typically, point clouds corresponding to more recent time periods will contain more points as compared to point clouds corresponding to older time periods, due to resolution improvements in measurement systems (e.g. cameras, LIDAR, etc.) over time. Contemporary point clouds can include large numbers of points and may therefore be difficult to process using conventional computer-implemented methods.

In many cases, the first and second point clouds 300, 400 can be misaligned. When misaligned, some corresponding points 302, 402 in the first and second point clouds 300, 400 may not be collocated. That is, the same location in the terrain topography may be represented by points at different locations in the first and second point clouds 300, 400. Misalignment can be caused by various measurement inaccuracies, such as GNSS (Global Navigation Satellite System, also colloquially known as GPS), INS (Inertial Navigational System), or LIDAR scanner inaccuracies in aerial LIDAR systems. Misalignment can also be caused by various environmental conditions that may impact a given measurement, such as wind conditions. Older point clouds are often misaligned with newer point clouds due to the older point clouds being obtained from older, less accurate measurement systems. Misalignment can make it difficult to evaluate changes in the terrain topography and/or reduce the accuracy of the calculated changes. For example, at a given GPS coordinate, the first point cloud 300 may show a localized peak, whereas the second point cloud 400 may show a localized depression—however, this difference in elevation may be the result of misalignment between the first and second point clouds 300, 400, rather than an actual change in elevation of the represented terrain. However, the terrain topography evaluation system 110 can align the first and second point clouds 300, 400 so that corresponding points 302, 402 between the first and second point clouds 300, 400 can be determined.

Figure 5:
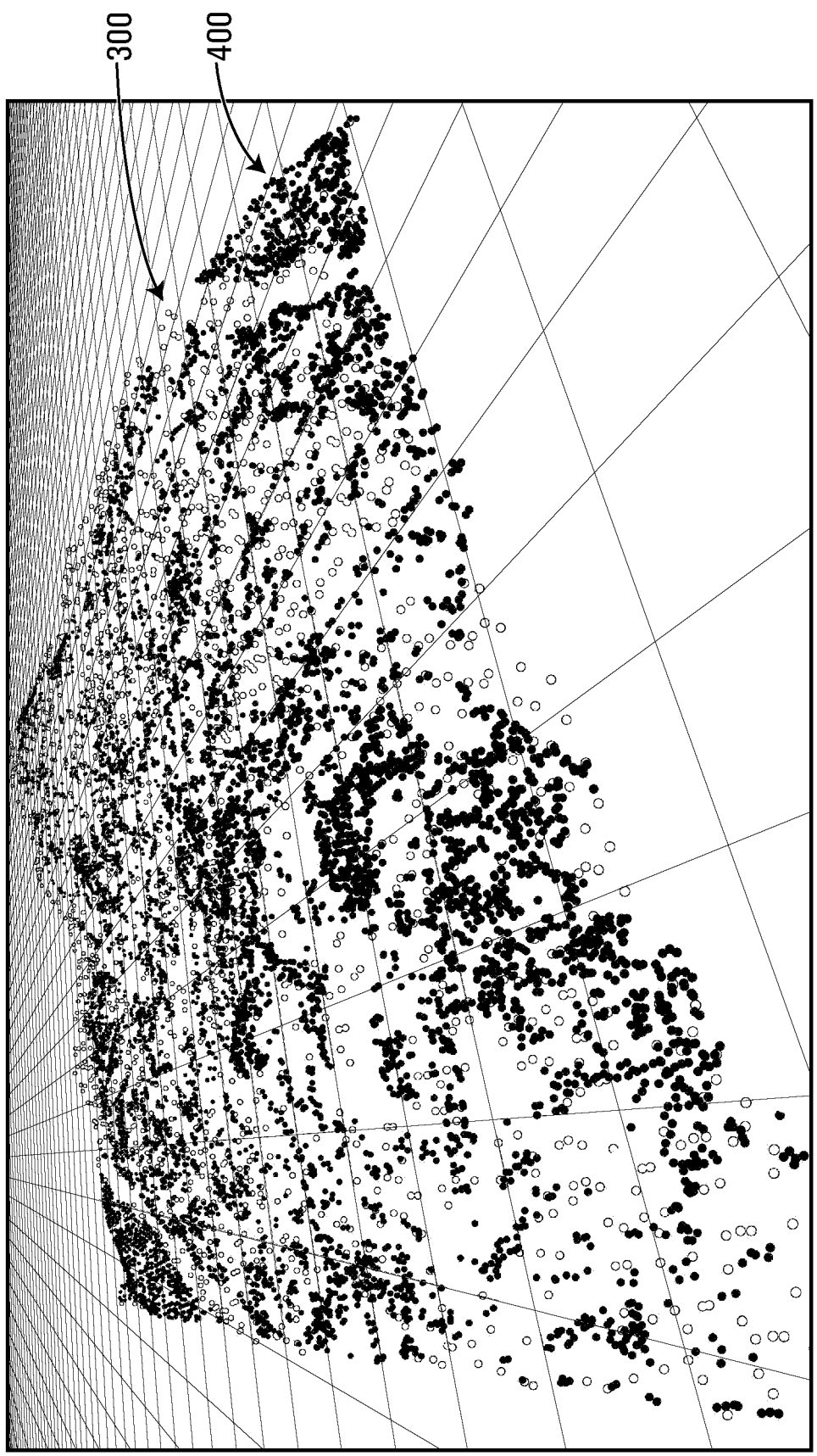
FIG. 5 is a perspective view of an aligned version of the first and second point clouds shown in FIGS. 3 and 4, in accordance with an embodiment.

Referring to FIG. 5, there is shown an aligned version of the first and second point clouds 300, 400 that can be generated by the terrain topography evaluation system 110. Once the first and second point clouds 300, 400 are aligned, the terrain topography evaluation system 110 can determine corresponding points between the first and second point clouds 300, 400 and evaluate differences in the terrain topography.

Figure 6:
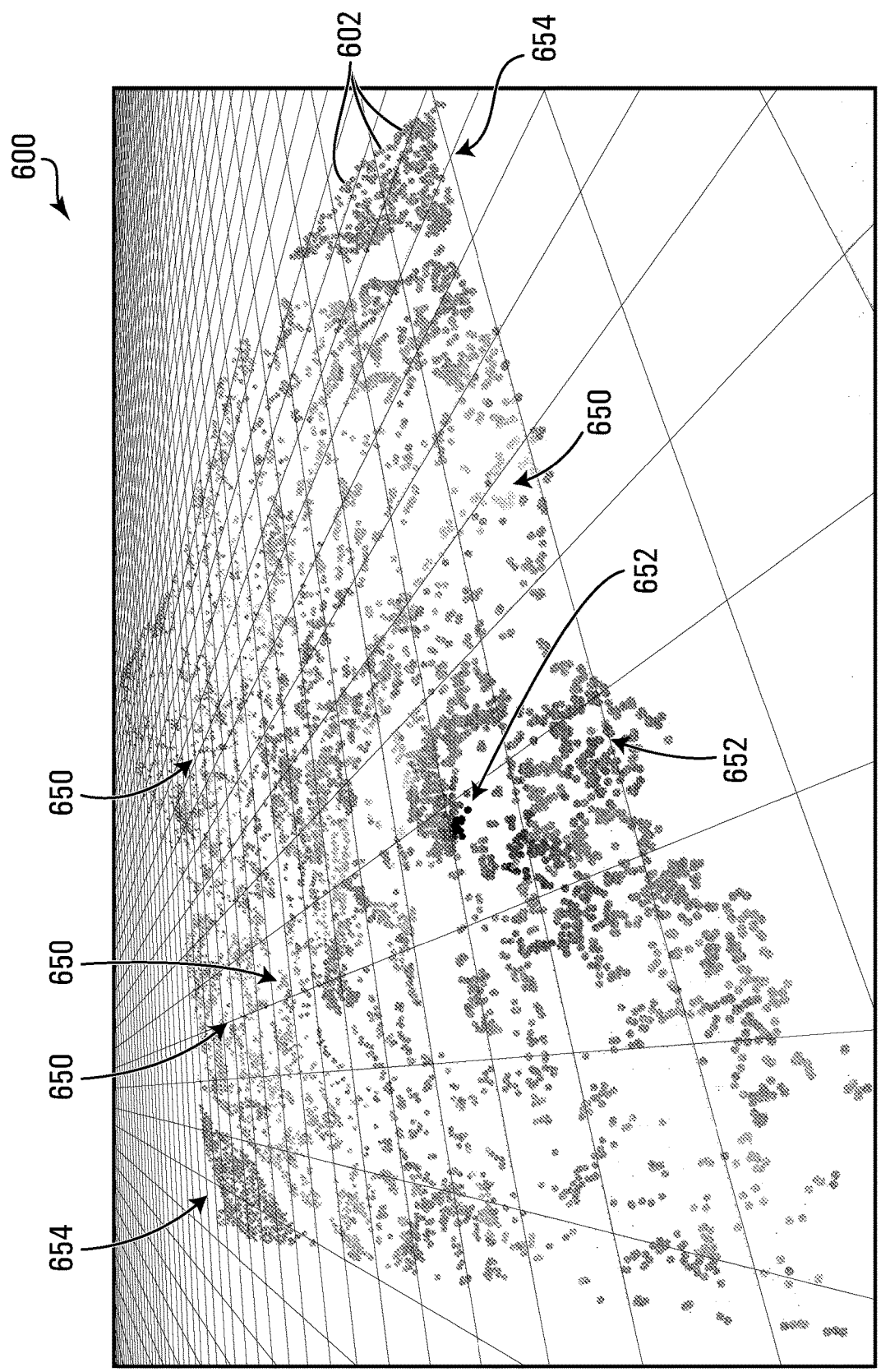
FIG. 6 is a perspective view of an example third point cloud representing topographical differences between the aligned first and second point clouds shown in FIG. 5, in accordance with an embodiment.

Referring to FIG. 6, there is shown a third point cloud 600 representing topographical differences between the aligned first and second point clouds 300, 400 that can be generated by the terrain topography evaluation system 110. As shown, the third point cloud 600 includes a third plurality of points 602 representing topographical differences between the positions of corresponding points in the aligned first and second point clouds 300, 400. In the illustrated example, the positions of the points 602 in the third point cloud 600 correspond to the positions of the points 402 in the second point cloud 400—however the points 602 additionally represent topographical differences between the first and second point clouds 300, 400.

Referring back to FIG. 1, the terrain topography evaluation system 110 can generally implemented using hardware or a combination of hardware and software. For example, the terrain topography evaluation system 110 may be implemented using an electronic tablet device, a personal computer, workstation, server, portable computer, mobile device, personal digital assistant, laptop, smart phone, WAP (Wireless Application Protocol) phone, or any combination of these. In some embodiments, the terrain topography evaluation system 110 may be implemented by two or more computers distributed over a wide geographic area and connected through a network (e.g. a private network and/or the internet). As shown, the terrain topography evaluation system 110 can include at least one processor 112, at least one data storage 114, and at least one communication interface 116. Each of these components may be divided into additional components or combined into fewer components. Some of the components may be distributed over a wide geographic area and connected through a network.

The processor 112 can be implemented with any suitable processor, controller, digital signal processor, graphics processing unit (GPU), application specific integrated circuits (ASICs), and/or field programmable gate arrays (FPGAs) that can provide sufficient processing power for the configuration, purposes and requirements of the terrain topography evaluation system 110. The processor 112 can include more than one processor with each processor being configured to perform different dedicated tasks. The processor 112 can be configured to control the operation of the terrain topography evaluation system 110. The processor 112 can execute various instructions stored in the data storage 114 to implement the various terrain topography evaluation methods described herein.

Figure 2:
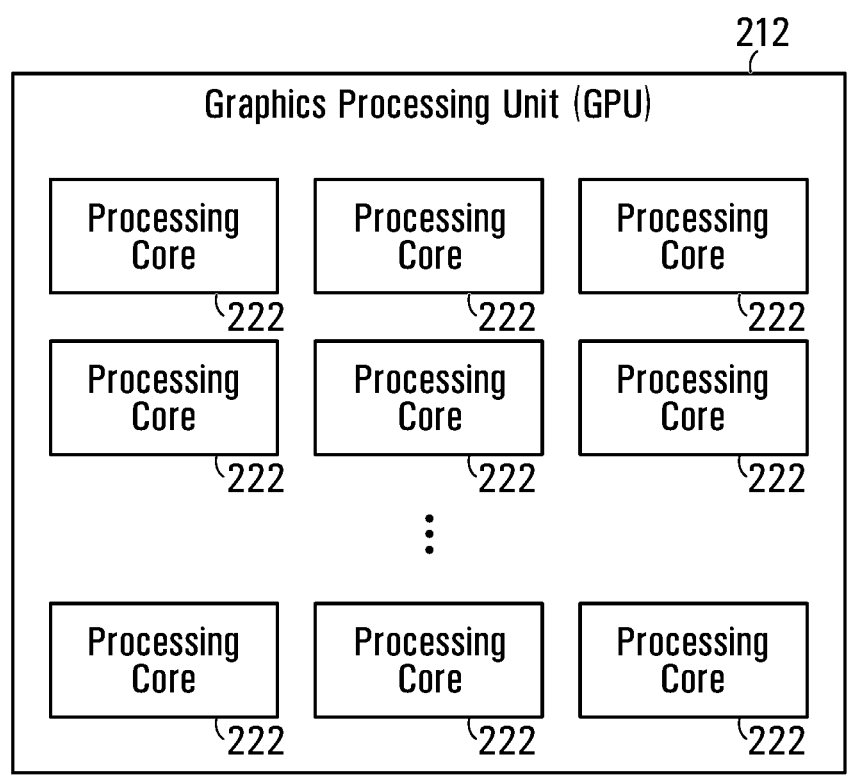
FIG. 2 is a block diagram of an example graphics processing unit (GPU) for the terrain topography evaluation system shown in FIG. 1, in accordance with an embodiment.

In various embodiments, the processor 112 can include one or more graphics processing units (GPU). Referring to FIG. 2, there is shown an example GPU 212. As shown, the GPU 212 can include a plurality of graphics processing cores 222. Each processing core 222 can perform processing tasks in parallel with the other processing cores 222. Typically, a GPU includes a substantially larger number of processing cores as compared to a general purpose processor, such as a central processing unit (CPU). For example, a GPU can include hundreds or even thousands of processing cores, whereas a CPU typically includes sixteen or less cores. Processing tasks that can be divided and processed in parallel among a large number of processing cores can therefore be executed more effectively on a GPU as compared to a general purpose processor. In some embodiments, the processor 112 can include one or more CPUs.

Referring back to FIG. 1, the data storage 114 can include RAM (Random-Access Memory), ROM (Read-Only Memory), one or more hard drives, one or more solid state drives (e.g. flash drives) or some other suitable non-transitory data storage elements such as disk drives. The data storage 114 can store instructions that can be executed by the processor 112 to implement the various terrain topography evaluation methods described herein. The data storage 114 can also store various data used or generated by the various terrain topography evaluation methods described herein. For example, the data storage 114 may store various point clouds. The data storage 114 may include one or more databases (not shown), such as a relational database (e.g., a SQL database), for example. The data storage 114 may be used to store an operating system that provides various basic operational processes for the processor 112.

The communication interface 116 can include any interface that enables the terrain topography evaluation system 110 to communicate with various devices and other systems. The communication interface 116 can include at least one of a serial port, a parallel port or a USB port, in some embodiments. Alternatively or in addition, the communication interface 116 may include an interface to a component via one or more of a Bluetooth, WIFI, Internet, Local Area Network (LAN), Ethernet, Firewire, modem, fiber, or digital subscriber line connection. Various combinations of these elements may be incorporated within the communication interface 116. For example, the communication interface 116 may receive input from various input devices, such as a mouse, a keyboard, a touch screen, a thumbwheel, a track-pad, a track-ball, a card-reader, voice recognition software and the like depending on the requirements and implementation of the terrain topography evaluation system 110.

As shown, the terrain topography evaluation system 110 can be in communication with various components, such as at least one external data storage 130 and at least one point cloud measurement system 140, through a network 150. The network 150 can be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the terrain topography evaluation system 110 and various components. In other embodiments, the terrain topography evaluation system 110 is not communicatively coupled to a network.

The external data storage 130 can store various data associated with the operation of the terrain topography evaluation system 110, similar to the data storage 114. For example, various point clouds may be stored on the external data storage 130 for retrieval by the terrain topography evaluation system 110. In some embodiments, the external data storage 130 may store older, or less frequently used data as compared the data storage 114. In other embodiments, the terrain topography evaluation system 110 is not communicatively coupled to an external data storage.

The point cloud measurement system 140 can be any system that generates point cloud data corresponding to terrain topography. For example, the point cloud measurement system 140 can be an aerial LIDAR system, as shown. In the illustrated example, the aerial LIDAR system can generate point clouds based on laser ranging of a terrain, INS and GNSS. However, it should be appreciated that the point cloud measurement system 140 can be any suitable system for generating point cloud data. In other embodiments, point cloud processing system 110 is not communicatively coupled to a point cloud measurement system. For example, data collected by a point cloud measurement system may instead be separately transferred (e.g. by memory card or flash drive) to point cloud processing system 110.

Figure 7:
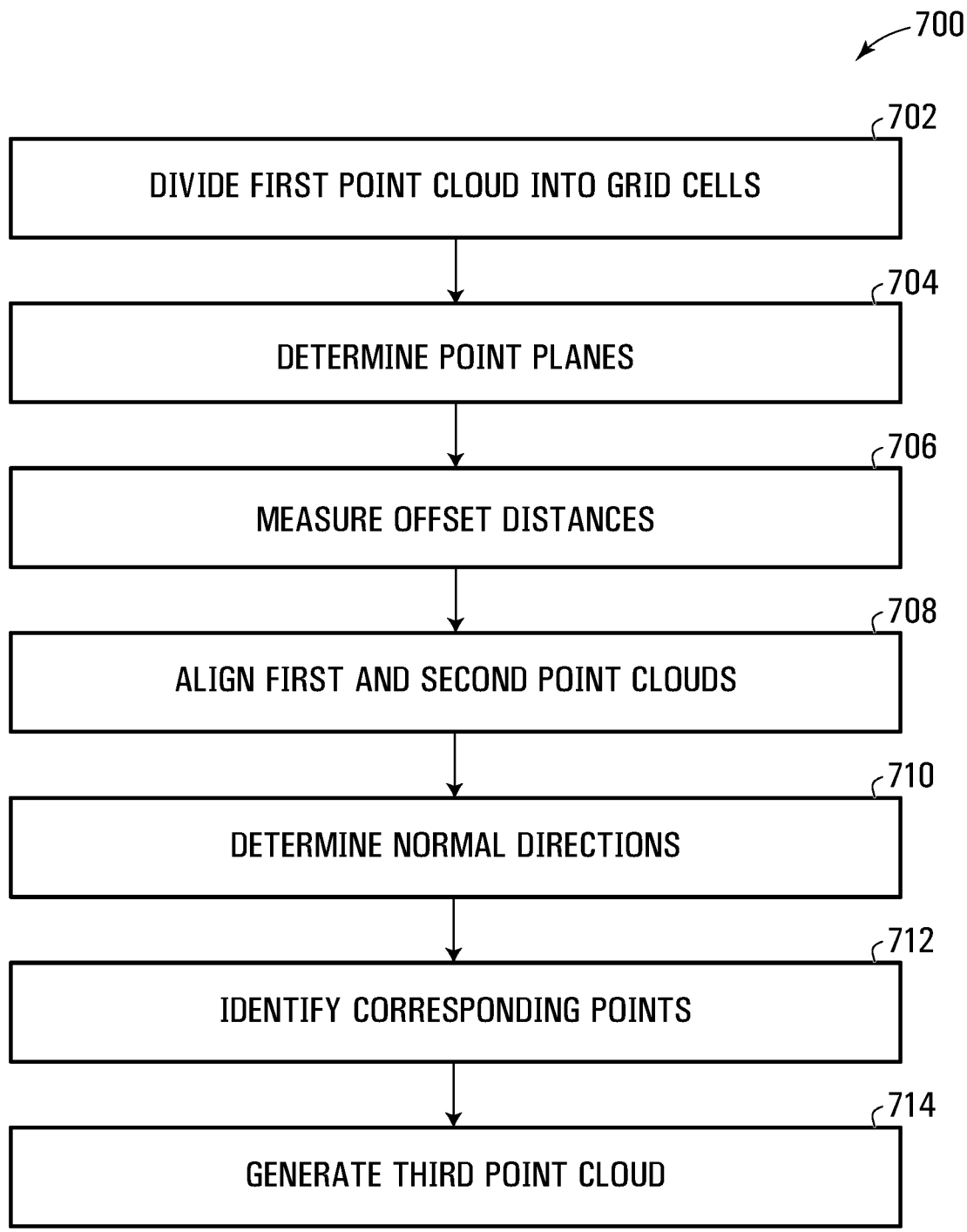
FIG. 7 is a flowchart of an example method operating the terrain topography evaluation system shown in FIG. 1, in accordance with an embodiment.

Referring now to FIG. 7, there is shown an example method 700 for operating the terrain topography evaluation system 110. In various embodiments, the terrain topography evaluation method 700 can be implemented by one or more processors 112 collectively executing instructions collectively stored in one or more data storages 114. As described herein, the one or more processors 112 can include one or more GPUs 212 that include a plurality of graphics processing cores 222. In some embodiments, the one or more processors 112 can include one or more CPUs. Various steps of the method 700 can be performed by the one or more GPUs 212 or the one or more CPUs or both. In some embodiments, some steps are performed by the one or more GPUs 212 and other steps are performed by the one or more CPUs.

The terrain topography evaluation method 700 can be used to compare a first point cloud 300 corresponding to a terrain topography during a first time period to a second point cloud 400 corresponding to the terrain topography during a second time period. For ease of exposition, reference will simultaneously be made to FIGS. 3-6, and 8-11B to illustrate various aspects of the first and second point clouds 300, 400 when explaining the terrain topography evaluation method 700.

At 702, the first point cloud 300 is divided into into a plurality of grid cells. For example, FIG. 3, shows a plurality of example grid cells 312 for the first point cloud 300. As shown, each grid cell 312 contains one or more points 302 of the first point cloud 300, and each point 302 is contained in one of the grid cells 312. Dividing the first point cloud 300 into a plurality of grid cells 312 can allow the plurality of graphics processing cores 222 to execute parallel point processing of the first point cloud 300 based on the grid cells 312.

In the illustrated example, the grid cells 312 are defined based on a two-dimensional grid. As shown, the two-dimension grid has a regular grid spacing such that each grid cell 312 has the same size and shape, and there are no gaps or overlaps between neighbouring grid cells 312. The grid spacing can vary depending on the density of the point cloud 300, and/or the type of parallel point processing to be performed based on the grid cells 312.

It should be appreciated that, in general, the first point cloud 300 can be divided in any manner to form the grid cells 312. That is, the grid cells 312 may irregularly spaced and can be any shape or size. In some embodiments, the first point cloud 300 may be divided based on a three-dimensional grid. In general, there can be any number of grid cells 312. In some embodiments, the plurality of grid cells includes at least twenty grid cells 312. In some embodiments, the plurality of grid cells includes at least one hundred grid cells 312.

In some embodiments, the grid cells 312 can be represented by a data structure that identifies the points 302 contained in each grid cell 312. For example, each of the points 302 may be assigned an index value, and the data structure can indicate the index values of the points 302 contained within each grid cell 312.

At 704, for each point 302 in the first point cloud 300, a point plane is determined. For example, FIG. 10 shows a plurality of example point planes 340 for a portion of the first point cloud 300. As shown, each point 302 can be associated with a point plane 340. Each point plane 340 can represent an approximation of a surface at the respective point 302. As shown, each point plane 340 can have a normal direction 342 that is generally perpendicular to the point plane 340.

Figure 9:
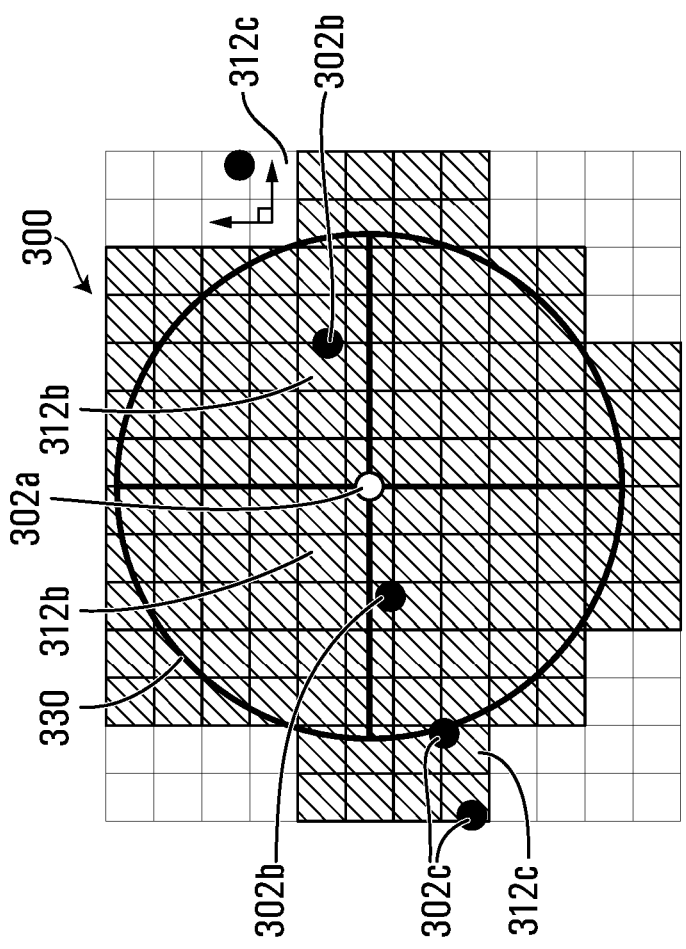
FIG. 9 is a top view of a downsampled version of the portion of the first point cloud shown in FIG. 8, in accordance with an embodiment.

Point planes 340 may be determined in any suitable manner. In some embodiments, each point plane 340 can be determined based on the respective point 302 and one or more points 302 in the first point cloud 300 adjacent to the respective point 302. For example, FIG. 9 shows point 302a and adjacent points 302b that can be used to determine the point plane 340 for point 302a. As shown, the one or more points 302b adjacent to the point 302a can be determined based on a predetermined distance 330 from the respective point 302a. In the illustrated example, the predetermined distance 330 defines a sphere centered at point 302a. As shown, adjacent points 302b are within the predetermined distance 330, whereas non-adjacent points 302c are not within the predetermined distance 330.

In various embodiments, the predetermined distance 330 can be selected based on the density of the first point cloud 300. For example, the predetermined distance 330 can be selected so that the resulting sphere is likely to contain a particular number of points 302. The predetermined distance 330 can also be selected so that the effect of sharp local changes in the terrain topography (e.g., boulders) on the point planes 340 can be reduced.

In some embodiments, the plurality of graphics processing cores 222 of the GPU(s) 212 can execute parallel point processing based on the plurality of grid cells 312 to determine the point planes 340. For example, one or more grid cells 312b that that are within the predetermined distance 330 of the respective point 302a can be identified. For each identified grid cell 312b, one or more points 302b within that grid cell 312 that are within the predetermined distance 330 of the respective point 302a can then be identified. In the illustrated example, grid cells 312b are within the predetermined distance 330, whereas grid cells 312c are not within the predetermined distance 330. Within grid cells 312b, points 302b are within the predetermined distance 330, whereas points 302c are not within the predetermined distance 330. In this manner, two or more processing cores 222 can separately and simultaneously process different subsets of points 302 (i.e., points 302 within different grid cells 312) to perform step 704.

Processing the grid cells 312 to identify relevant grid cells 312b can reduce the amount of processing required to identify the adjacent points 302b, and therefore to determine the point planes 340. Identifying relevant grid cells 312b can eliminate the need to process the entire point cloud 300 because points 302 within the non-relevant grid cells 312c need not be considered. Additionally, the grid cells 312 and points 302 therein can be processed in parallel by the graphics processing cores 222 of the GPU(s) 212, further improving efficiency. This may not be possible using conventional tree-based approaches which randomly traverse the point cloud 300, such as a kd-tree.

At 706, a plurality of plane offset distances is measured. For example, FIG. 10 shows a plurality of example plane offset distances 346 for a portion the first and second point clouds 300, 400. As shown, the plane offset distances 346 are measured between the point plane 340 of each point 302 in the first point cloud 300 and one or more points 402 in the second point cloud 400. That is, each plane offset distance 346 corresponds to the "point-to-plane" distance between a point 402 in the second point cloud 400 and a point plane 340 for a point 302 in the first point cloud 300.

At 708, the first and second point clouds 300, 400 are aligned. For example, FIG. 5 shows the first and second point clouds 300, 400 having been aligned. The first and second point clouds 300, 400 are aligned based on the plurality of plane offset distances 346. Aligning the first and second point clouds 300, 400 using plane offset distances 346 can reduce the impact of the changes in the terrain topography on alignment as compared to using point-to-point distances.

The first and second point clouds 300, 400 can be aligned by minimizing the plane offset distances 346 of associated points 302, 402 in the first and second point clouds 300, 400. The associated points 302, 402 can be determined based on one or more plane offset distances 346, such that each point 302 in the first point cloud 300 is associated with a different point 402 in the second point cloud 400. Preferably, the points 302, 402 that have the lowest plane offset distance 346 therebetween are determined as associated points 302, 304. However, if a point 402 in the second point cloud 400 is the lowest plane offset distance 346 for two or more points 302 in the first point cloud 300, another point 402 having the next lowest plane offset distance 346 may be determined to be associated with one of the points 302. Once the associated points 302, 402 are determined, the first and second point clouds 300, 400 can be aligned by minimizing the plane offset distances 346 of the associated points 302, 402. In some embodiments, the first and second point clouds 300, 400 can be aligned by minimizing the sum of squared plane offset distances 346 of associated points 302, 402.

Various transformations can be applied to at least one of the first and second point clouds 300, 400 to align the first and second point clouds 300, 400. For example, at least one of the first and second point clouds 300, 400 can be translated or rotated. Additionally, or alternatively, at least one of the first and second point clouds 300, 400 may be stretched, squeezed, sheered, etc. Preferably, the transformations can be applied to minimize the plane offset distances 346 of associated points 302, 402.

In some embodiments, aligning the first and second point clouds 300, 400 can be an iterative process. For example, subsequent to minimizing the plane offset distances 346 of associated points 302, 402, new associated points 302, 402 can be determined, and plane offset distances 346 between the new associated points 302, 402 can be minimized. In some cases, the alignment process can be repeated until a predetermined threshold is satisfied. For example, the steps of determining associated points 302, 402 in the first and second point clouds 300, 400 and minimizing the plane offset distances 346 of the associated points 302, 402 can be repeated until the plane offset distances 346 are less than a predetermined value. In some embodiments, an iterative closest point (ICP) algorithm may be used to iteratively align the first and second point clouds 300, 400.

In some embodiments, some points 302, 402 may be excluded from consideration during alignment. For example, portions of the first and second point clouds 300, 400 that represent large changes in the terrain topography may not be considered during alignment.

At 710, for each point 402 in the second point cloud 400, a normal direction is determined. The normal direction is be determined in a similar manner as described herein with regard to the point planes 340 for the first point cloud 300. That is, the normal direction is determined based on that point 402 and one or more points 402 in the second point cloud 400 adjacent to that point 402. The normal direction can define a direction that is generally perpendicular to a point plane. For example, FIG. 10 shows a plurality of example point planes 340 and corresponding normal directions 342 for the first point cloud 300. In some embodiments, the second point cloud 400 can be divided into a plurality of grid cells and the plurality of graphics processing cores 222 can execute parallel point processing based on the plurality of grid cells to determine the normal directions in a similar manner as described herein for the point planes 340.

At 712, for each point 402 the aligned second point cloud 400, one or more corresponding points 302 in the aligned first point cloud 300 are identified. The one or more corresponding points 302 in the aligned first point cloud 300 are identified based on volumes projected in the normal direction of each of the points 402 in the aligned second point cloud 400. For example, FIGS. 12A-C show an example projected volume 440 extending from point 402a along the normal direction into a portion of the aligned first point cloud 300. In the illustrated example, points 302d are within the projected volume 440 and are therefore determined to correspond to point 402a. On the other hand, points 302e are outside of the projected volume 440, and therefore are not determined to correspond to point 402a.

In the illustrated example, the projected volume 440 has a capsule shape (i.e., a cylinder having hemispherical ends, where the hemispheres and cylinder each have the same radius). In other words, the projected volume 440 is defined by a cylinder with semi-spherical ends. However, it should be appreciated that the projected volume 440 may be any three dimensional shape. For example, the projected volume 440 may be a cylinder, a polyhedron (e.g. cuboid, or triangular prism), etc.

Figure 11B:
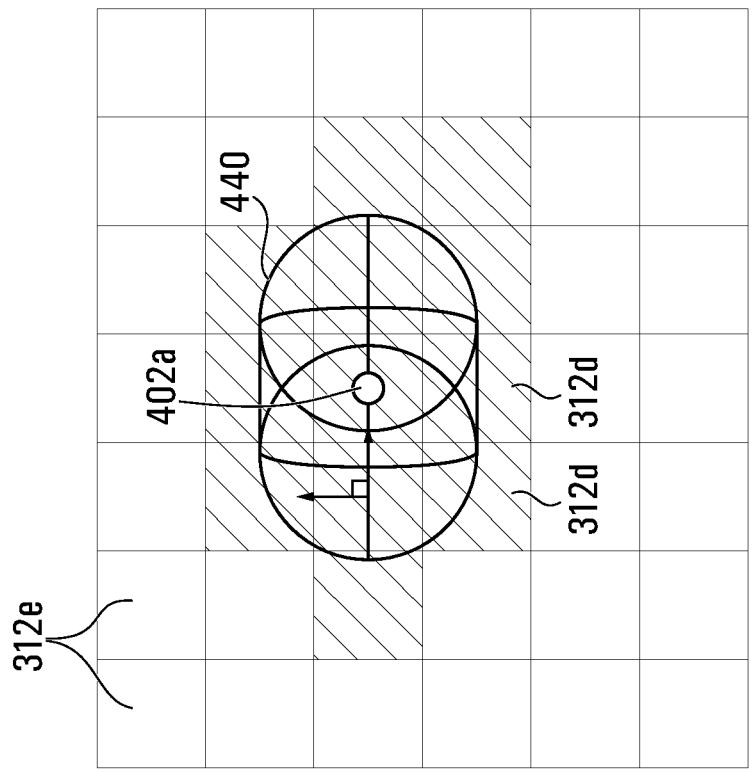
FIGS. 11A and 11B are perspective and top views of a volume projected in the normal direction of a point in the aligned second point cloud shown in FIG. 5, in accordance with an embodiment.
Figure 11A:
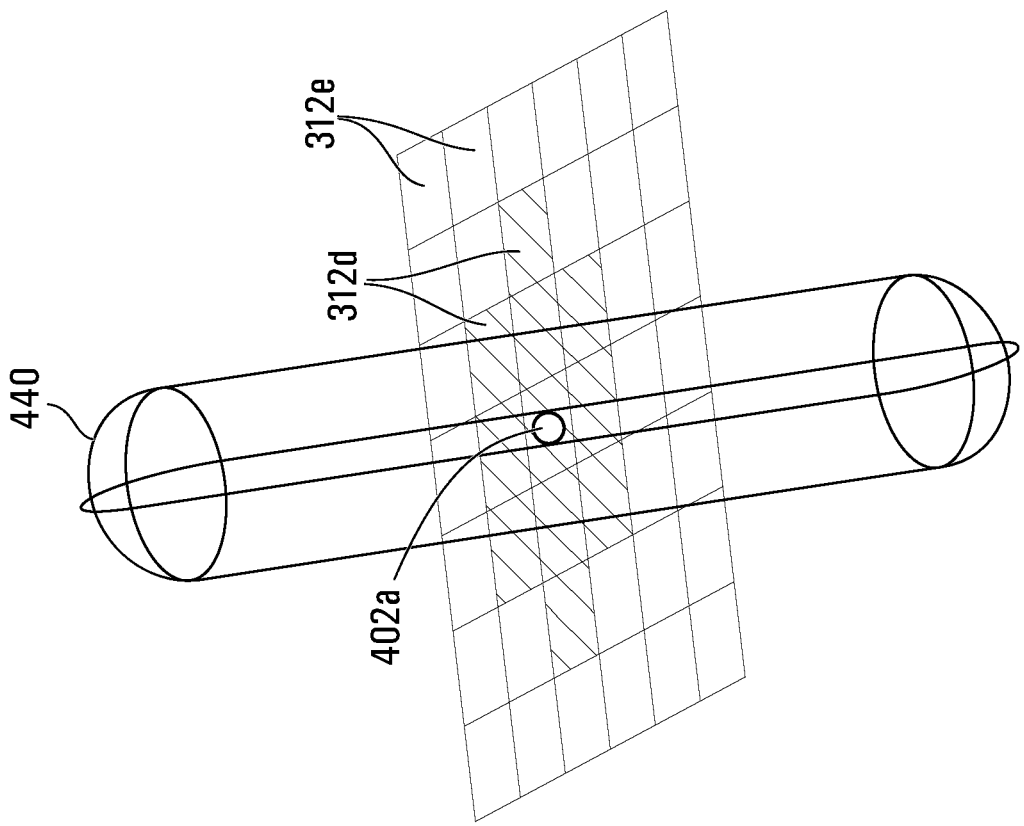

In some embodiments, the plurality of graphics processing cores 222 can execute parallel point processing based on the plurality of grid cells 312 to determine corresponding points 302 in the aligned first point cloud 300. For example, FIGS. 11A-B, show an example projected volume 440 extending from point 402a along the normal direction into a plurality of grid cells 312. As shown, one or more grid cells 312d that that are intersect with the projected volume 440 can be identified. For each identified grid cell 312d, one or more points 302d within that grid cell 312b that are within the projected volume 440 can then be identified. In this manner, two or more processing cores 222 can separately and simultaneously process different subsets of points 302 (i.e., points 302 within different grid cells 312) to perform step 712.

Processing the grid cells 312 to identify relevant grid cells 312d can reduce the amount of processing required to identify the corresponding points 302d. This is because identifying the relevant grid cells 312d can eliminate the need to process the entire point cloud 300, since points 302 within the non-relevant grid cells 312e need not be processed. Additionally, the grid cells 312 can be processed in parallel by the graphics processing cores 222, further improving efficiency. This may not be possible using conventional tree-based approaches which randomly traverse the point cloud 300, such as a kd-tree.

At 714, a third point cloud is generated. The third point cloud includes a third plurality of points corresponding to topographical differences between the positions of corresponding points in the aligned first and second point clouds 300, 400. For example, FIG. 6, shows an example third point cloud 600. As shown, the third point cloud 600 includes a third plurality of points 602. Each point 602 represents a topographical difference between the positions of corresponding points in the aligned first and second point clouds 300, 400. As shown, the third point cloud 600 includes regions of negative displacement 650, regions of positive displacement 652, and regions of no substantial displacement 654.

In some embodiments, the third point cloud 600 can be used to generate graphical representations of changes in the terrain topography. For example, the third point cloud 600 may be used to generate a topographic map that visually indicates increases or decreases in elevation over time, for example, using colour. In some embodiments, the graphical representations may have smaller file sizes as compared to the third point cloud 600.

In various embodiments, at least one of the first and second point clouds 300, 400 may be downscaled at various stages of the terrain topography evaluation method 700. That is, at least some of the points 302, 402 can be removed in the respective point cloud 300, 400. Because the first and second point clouds 300, 400 can include a large number of points 302, 402, removing at least some of the points 302, 402 can significantly improve the speed of processing the point clouds 300, 400. In other embodiments, method 700 may not include any downscaling.

Figure 8:
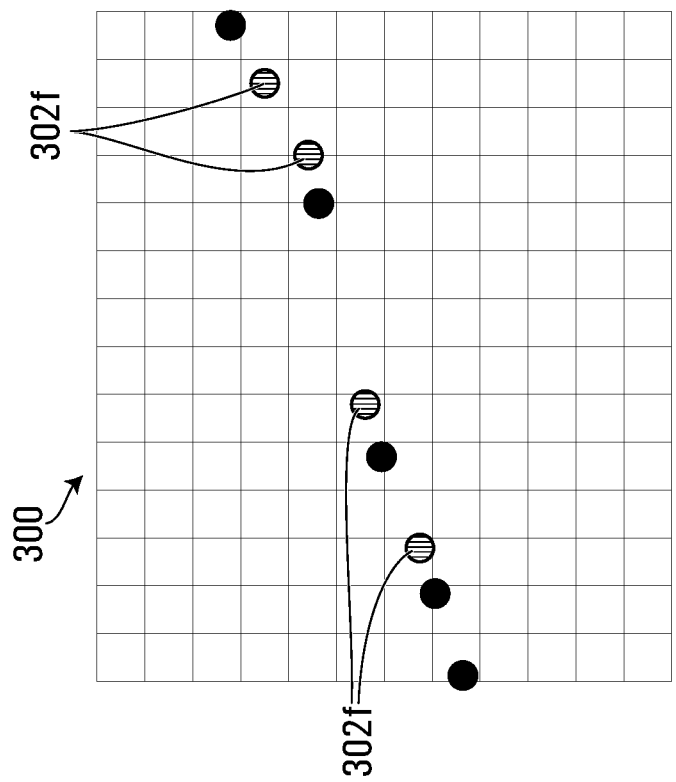
FIG. 8 is a top view of a portion of the first point cloud shown in FIG. 3, in accordance with an embodiment.

In some embodiments, at least one of the first and second point clouds 300, 400 can be downscaled prior to determining the point planes 340 (i.e., at 704). Downscaling the first and second point clouds 300, 400 at this point can improve the speed of determining point planes 340 and normal directions 342 because fewer points 302, 402 are processed when identifying adjacent points. For example, FIGS. 8-9 show at least some of the points 302d being removed from a portion of the first point cloud 300. As shown, points 302d are removed from the first point cloud 300 prior to determining the adjacent points 302b used to determine the point planes 340 and normal directions 342.

Alternatively or in addition to downscaling prior to step 704, the first and second point clouds 300, 400 can be downscaled prior to alignment (i.e., at 708). Downscaling the first and second point clouds 300, 400 at this point can improve the speed of alignment because fewer plane offset distances 346 are considered.

Alternatively or in addition to downscaling prior to step(s) 704 and/or 708, the first and second point clouds 300, 400 can be downscaled prior to determining the normal directions and identifying corresponding points 302, 402 (i.e. at 710 to 712). Downscaling the first and second point clouds 300, 400 at this point can improve the speed of determining the normal directions and corresponding points 302, 402 because fewer points 302, 402 are processed.

In some embodiments, different amounts of downscaling can be applied at different stages of the method 700. That is, a greater number of points 302, 402 may be removed at one step of the method 700 as compared to another step of the method 700. For example, the point clouds 300, 400 used to determine normal directions, identify corresponding points 302, 402, and generate the third point cloud 600 (i.e., at 710 to 714) may be more downscaled as compared to the point clouds 300, 400 used to determine point planes 340 and align the point clouds 300, 400 (i.e., at 704 to 708). Applying downscaling in this manner typically results in a good trade-off between accuracy and speed because alignment typically requires a greater amount of accuracy as compared to change detection. It should be appreciated that, although some steps of the method 700 may use downscaled versions of the first and second point clouds 300, 400, other steps of the method 700 may use non-downscaled versions of the first and second point clouds 300, 400.

In some embodiments, grid cells 312 having different grid spacing may be used at different stages of the method 700. That is, different grid cell 312 sizing can be used for different types of parallel point processing. For example, smaller grid cells 312 may be used at 704 to determine the point planes 340, whereas larger grid cells 312 may be used at 712 to determine the corresponding points 302, 402. It may be desirable to process fewer grid cells 312 at 712 because determining the intersection of the grid cells 312 with the projected volume 440 may be computationally intensive. Similarly, it may be desirable to process a larger number of grid cells 312 at 704 because identifying grid cells 312 within a predetermined distance 330 may not be computationally intensive.

It should be appreciated that although some steps of the method 700 have been described with regard to the first point cloud 300 or the second point cloud 400, the other point cloud 300, 400 may be used instead, in some embodiments. For example, at 704 to 708, point planes may be determined for each point 402 in the second point cloud 400, and the first and second point clouds 300, 400 may be aligned by minimizing plane offset distances between the point planes of points 402 in the second point cloud 400 and points 302 in the first point cloud 300. As another example, at 712, volumes may be projected from points 302 in the first point cloud 300 into the second point cloud 400 to determine the corresponding points 302, 402.

In some embodiments, the second point cloud 400 can also be divided into a plurality of grid cells, in a similar fashion as described herein for the first point cloud 300. In this manner, parallel point processing can also be performed on the second point cloud 400 based on the plurality of grid cells, in a similar manner as described herein for the first point cloud 300. The grid cells for the second point cloud 400 may have the same or different grid spacing as compared to the first point cloud 300.

Although the preceding examples are described with respect to point clouds representing terrain topographies, it should be appreciated that the systems and methods described herein may be used to process point clouds representing other objects, in some embodiments. For example, the systems and methods described herein may be used to evaluate changes in various other three-dimensional objects over time.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object oriented programming. Accordingly, the program code may be written in C, C++, C#, or any other suitable programming language and may comprise modules or classes, as is known to those skilled in object oriented programming, such as GPU Shader Code or Compute Shaders. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

As used herein and in the claims, a first element is said to be 'communicatively coupled to' or 'communicatively connected to' or 'connected in communication with' a second element where the first element is configured to send or receive electronic signals (e.g. data) to or from the second element, and the second element is configured to receive or send the electronic signals from or to the first element. The communication may be wired (e.g. the first and second elements are connected by one or more data cables), or wireless (e.g. at least one of the first and second elements has a wireless transmitter, and at least the other of the first and second elements has a wireless receiver). The electronic signals may be analog or digital. The communication may be one-way or two-way. In some cases, the communication may conform to one or more standard protocols (e.g. SPI, I²C, Bluetooth™, or IEEE™ 802.11). The communication may involve one or more intervening elements, such as a router.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

Items List

Item 1. A method for evaluating changes in terrain topography over time using one or more processors, the one or more processors comprising one or more graphics processing units (GPU), the one or more GPUs comprising a plurality of graphics processing cores, wherein a first point cloud corresponds to the terrain topography during a first time period and a second point cloud corresponds to the terrain topography during a second time period, the first point cloud and the second point cloud each comprising a plurality of points, each point representing a three-dimensional position on the terrain topography, the method comprising the one or more processors collectively executing instructions to:

divide the first point cloud into a plurality of grid cells, each grid cell containing one or more points of the first point cloud;

for each point in the first point cloud, determine a point plane based on that point and one or more points in the first point cloud adjacent to that point;

measure a plurality of plane offset distances, the plurality of plane offset distances comprising, for each point in the first point cloud, one or more plane offset distances measured between the point plane corresponding to that point and one or more points in the second point cloud;

align the first and second point clouds based on the plurality of plane offset distances;

for each point in the second point cloud, calculate a normal direction based on that point and one or more points in the second point cloud adjacent to that point;

for each point in the aligned second point cloud, identify one or more corresponding points in the aligned first point cloud, the one or more corresponding points being located within a volume projected in the normal direction of that point; and generate a third point cloud comprising a third plurality of points corresponding to topographical differences between positions of corresponding points in the aligned first and second point clouds;

wherein the plurality of graphics processing cores execute parallel point processing based on the plurality of grid cells in at least one of said determining and said identifying steps.

Item 2. A method for evaluating changes in terrain topography over time, wherein a first point cloud corresponds to the terrain topography during a first time period and a second point cloud corresponds to the terrain topography during a second time period, the first point cloud and the second point cloud each comprising a plurality of points, each point representing a three-dimensional position on the terrain topography, the method comprising one or more processors collectively executing instructions to:

for each point in the first point cloud, determine a point plane based on that point and one or more points in the first point cloud adjacent to that point;

measure a plurality of plane offset distances, the plurality of plane offset distances comprising, for each point in the first point cloud, one or more plane offset distances measured between the point plane corresponding to that point and one or more points in the second point cloud;

align the first and second point clouds based on the plurality of plane offset distances;

for each point in the second point cloud, calculate a normal direction based on that point and one or more points in the second point cloud adjacent to that point;

for each point in the aligned second point cloud, identify one or more corresponding points in the aligned first point cloud, the one or more corresponding points being located within a volume projected in the normal direction of that point; and generate a third point cloud comprising a third plurality of points corresponding to topographical differences between positions of corresponding points in the aligned first and second point clouds.

Item 3. The method of any preceding item, wherein identifying the one or more corresponding points in the aligned first point cloud for each point in the aligned second point cloud comprises:

identifying one or more grid cells that intersect with the projected volume; and for each identified grid cell, identifying one or more points in the aligned first point cloud within that grid cell that are within the projected volume.

Item 4. The method of any preceding item, wherein determining the point plane for each point in the first point cloud comprises:

identifying one or more grid cells that are within a predetermined distance of that point; and for each identified grid cell, identifying one or more points in the first point cloud within that grid cell that are within the predetermined distance of that point as the one or more points adjacent to that point.

Item 5. The method of any preceding item, wherein aligning the first and second point clouds comprises:

determining, for each point in the first point cloud, an associated point in the second point cloud based on one or more plane offset distances measured between the point plane corresponding to that point and one or more points in the second point cloud, wherein each point in the first point cloud is determined to be associated with a different point in the second point cloud; and aligning the first and second point clouds by minimizing plane offset distances of associated points in the first and second point clouds.

Item 6. The method of any preceding item, wherein aligning the first and second point clouds comprises:

iteratively determining the associated points in the first and second point clouds and minimizing the plane offset distances of the associated points using an iterative closest point (ICP) algorithm.

Item 7. The method of any preceding item, wherein the projected volume has a capsule shape.

Item 8. The method of any preceding item, further comprising the one or more processors collectively executing instructions to:

prior to determining the point plane for each point in the first point cloud, downsampling at least one of the first and second point clouds by removing at least some of the points in the respective point cloud.

Item 9. The method of any preceding item, further comprising the one or more processors collectively executing instructions to:

prior to identifying the one or more corresponding points in the aligned first point cloud for each point in the aligned second point cloud, downsampling at least one of the aligned first and second point clouds by removing at least some of the points in the respective point cloud.

Item 10. The method of any preceding item, wherein the second point cloud comprises a greater number of points than the first point cloud.

Item 11. The method of any preceding item, wherein the second time period is subsequent to the first time period.

Item 12. The method of any preceding item, wherein:

the one or more processors comprise one or more central processing units (CPU); and the one or more CPUs execute point processing in at least one step other than said determining and said identifying steps.

Item 13. The method of any preceding item, wherein:

the one or more processors comprises one or more graphics processing units (GPU), the one or more GPUs comprising a plurality of graphics processing cores;

the one or more processors further collectively execute instructions to divide the first point cloud into a plurality of grid cells, each grid cell containing one or more points of the first point cloud; and the plurality of graphics processing cores execute parallel point processing based on the plurality of grid cells in at least one of said determining and said identifying steps.

Item 14. A computer readable medium having instructions stored thereon collectively executable by one or more processors to implement the method of any preceding item.

Item 15. A system for evaluating changes in terrain topography over time, the system comprising:

one or more data storages collectively storing a first point cloud and a second point cloud, the first point cloud corresponding to the terrain topography during a first time period and the second point cloud corresponding to the terrain topography during a second time period, the first point cloud and the second point cloud each comprising a plurality of points, each point representing a three-dimensional position on the terrain topography; and one or more processors in electronic communication with the one or more data storages, the one or more processors comprising one or more graphics processing units (GPU), the one or more GPUs comprising a plurality of graphics processing cores, the one or more processors collectively executing instructions to:

divide the first point cloud into a plurality of grid cells, each grid cell containing one or more points of the first point cloud;

for each point in the first point cloud, determine a point plane based on that point and one or more points in the first point cloud adjacent to that point;

measure a plurality of plane offset distances, the plurality of plane offset distances comprising, for each point in the first point cloud, one or more plane offset distances measured between the point plane corresponding to that point and one or more points in the second point cloud;

align the first and second point clouds based on the plurality of plane offset distances;

for each point in the second point cloud, calculate a normal direction based on that point and one or more points in the second point cloud adjacent to that point;

for each point in the aligned second point cloud, identify one or more corresponding points in the aligned first point cloud, the one or more corresponding points being located within a volume projected in the normal direction of that point; and generate a third point cloud comprising a third plurality of points corresponding to topographical differences between positions of corresponding points in the aligned first and second point clouds;

wherein the plurality of graphics processing cores execute parallel point processing based on the plurality of grid cells in at least one of said determining and said identifying steps.

Item 16. A system for evaluating changes in terrain topography over time, the system comprising:

one or more data storages collectively storing a first point cloud and a second point cloud, the first point cloud corresponding to the terrain topography during a first time period and the second point cloud corresponding to the terrain topography during a second time period, the first point cloud and the second point cloud each comprising a plurality of points, each point representing a three-dimensional position on the terrain topography; and one or more processors in electronic communication with the one or more data storages, the one or more processors collectively executing instructions to:

for each point in the first point cloud, determine a point plane based on that point and one or more points in the first point cloud adjacent to that point;

measure a plurality of plane offset distances, the plurality of plane offset distances comprising, for each point in the first point cloud, one or more plane offset distances measured between the point plane corresponding to that point and one or more points in the second point cloud;

align the first and second point clouds based on the plurality of plane offset distances;

for each point in the second point cloud, calculate a normal direction based on that point and one or more points in the second point cloud adjacent to that point;

for each point in the aligned second point cloud, identify one or more corresponding points in the aligned first point cloud, the one or more corresponding points being located within a volume projected in the normal direction of that point; and generate a third point cloud comprising a third plurality of points corresponding to topographical differences between positions of corresponding points in the aligned first and second point clouds.

Item 17. The system of any preceding item, wherein identifying the one or more corresponding points in the aligned first point cloud for each point in the aligned second point cloud comprises:

identifying one or more grid cells that intersect with the projected volume; and for each identified grid cell, identifying one or more points in the aligned first point cloud within that grid cell that are within the projected volume.

Item 18. The system of any preceding item, wherein determining the point plane for each point in the first point cloud comprises:

identifying one or more grid cells that are within a predetermined distance of that point; and for each identified grid cell, identifying one or more points in the first point cloud within that grid cell that are within the predetermined distance of that point as the one or more points adjacent to that point.

Item 19. The system of any preceding item, wherein aligning the first and second point clouds comprises:

determining, for each point in the first point cloud, an associated point in the second point cloud based on one or more plane offset distances measured between the point plane corresponding to that point and one or more points in the second point cloud, wherein each point in the first point cloud is determined to be associated with a different point in the second point cloud; and aligning the first and second point clouds by minimizing plane offset distances of associated points in the first and second point clouds.

Item 20. The system of any preceding item, wherein aligning the first and second point clouds comprises:

iteratively determining the associated points in the first and second point clouds and minimizing the plane offset distances of the associated points using an iterative closest point (ICP) algorithm.

Item 21. The system of any preceding item, wherein the projected volume has a capsule shape.

Item 22. The system of any preceding item, wherein the one or more processors further collectively execute instructions to:

prior to determining the point plane for each point in the first point cloud, downsampling at least one of the first and second point clouds by removing at least some of the points in the respective point cloud.

Item 23. The system of any preceding item, wherein the one or more processors further collectively execute instructions to:

prior to identifying the one or more corresponding points in the aligned first point cloud for each point in the aligned second point cloud, downsampling at least one of the aligned first and second point clouds by removing at least some of the points in the respective point cloud.

Item 24. The system of any preceding item, wherein the second point cloud comprises a greater number of points than the first point cloud.

Item 25. The system of any preceding item, wherein the second time period is subsequent to the first time period.

Item 26. The system of any preceding item, wherein:

the one or more processors comprise one or more central processing units (CPU); and the one or more CPUs execute point processing in at least one step other than said determining and said identifying steps.

Item 27. The system of any preceding item, wherein:

the one or more processors comprises one or more graphics processing units (GPU), the one or more GPUs comprising a plurality of graphics processing cores;

the one or more processors further collectively execute instructions to divide the first point cloud into a plurality of grid cells, each grid cell containing one or more points of the first point cloud; and the plurality of graphics processing cores execute parallel point processing based on the plurality of grid cells in at least one of said determining and said identifying steps.

The invention claimed is:

1. A method for evaluating changes in terrain topography over time using one or more processors, the one or more processors comprising one or more graphics processing units (GPU), the one or more GPUs comprising a plurality of graphics processing cores, wherein a first point cloud corresponds to the terrain topography during a first time period and a second point cloud corresponds to the terrain topography during a second time period, the first point cloud and the second point cloud each comprising a plurality of points, each point representing a three-dimensional position on the terrain topography, the method comprising the one or more processors collectively executing instructions to:

divide the first point cloud into a plurality of grid cells, each grid cell containing one or more points of the first point cloud;

for each point in the first point cloud, determine a point plane based on that point and one or more points in the first point cloud adjacent to that point;

measure a plurality of plane offset distances, the plurality of plane offset distances comprising, for each point in the first point cloud, one or more plane offset distances measured between the point plane corresponding to that point and one or more points in the second point cloud;

align the first and second point clouds based on the plurality of plane offset distances;

for each point in the second point cloud, calculate a normal direction based on that point and one or more points in the second point cloud adjacent to that point;

for each point in the aligned second point cloud, identify one or more corresponding points in the aligned first point cloud, the one or more corresponding points being located within a volume projected in the normal direction of that point; and generate a third point cloud comprising a third plurality of points corresponding to topographical differences between positions of corresponding points in the aligned first and second point clouds;

wherein the plurality of graphics processing cores execute parallel point processing based on the plurality of grid cells in at least one of said determining and said identifying steps.

2. The method of claim 1, wherein identifying the one or more corresponding points in the aligned first point cloud for each point in the aligned second point cloud comprises:

identifying one or more grid cells that intersect with the projected volume; and for each identified grid cell, identifying one or more points in the aligned first point cloud within that grid cell that are within the projected volume.

3. The method of claim 1, wherein determining the point plane for each point in the first point cloud comprises:

identifying one or more grid cells that are within a predetermined distance of that point; and for each identified grid cell, identifying one or more points in the first point cloud within that grid cell that are within the predetermined distance of that point as the one or more points adjacent to that point.

4. The method of claim 1, wherein aligning the first and second point clouds comprises:

determining, for each point in the first point cloud, an associated point in the second point cloud based on one or more plane offset distances measured between the point plane corresponding to that point and one or more points in the second point cloud, wherein each point in the first point cloud is determined to be associated with a different point in the second point cloud; and aligning the first and second point clouds by minimizing plane offset distances of associated points in the first and second point clouds.

5. The method of claim 4, wherein aligning the first and second point clouds comprises:

iteratively determining the associated points in the first and second point clouds and minimizing the plane offset distances of the associated points using an iterative closest point (ICP) algorithm.

6. The method of claim 1, wherein the projected volume has a capsule shape.

7. The method of claim 1, further comprising the one or more processors collectively executing instructions to:

prior to determining the point plane for each point in the first point cloud, downsampling at least one of the first and second point clouds by removing at least some of the points in the respective point cloud.

8. The method of claim 1, further comprising the one or more processors collectively executing instructions to:

prior to identifying the one or more corresponding points in the aligned first point cloud for each point in the aligned second point cloud, downsampling at least one of the aligned first and second point clouds by removing at least some of the points in the respective point cloud.

9. The method of claim 1, wherein the second point cloud comprises a greater number of points than the first point cloud.

10. The method of claim 1, wherein the second time period is subsequent to the first time period.

11. A system for evaluating changes in terrain topography over time, the system comprising:

one or more data storages collectively storing a first point cloud and a second point cloud, the first point cloud corresponding to the terrain topography during a first time period and the second point cloud corresponding to the terrain topography during a second time period, the first point cloud and the second point cloud each comprising a plurality of points, each point representing a three-dimensional position on the terrain topography; and one or more processors in electronic communication with the one or more data storages, the one or more processors comprising one or more graphics processing units (GPU), the one or more GPUs comprising a plurality of graphics processing cores, the one or more processors collectively executing instructions to:

divide the first point cloud into a plurality of grid cells, each grid cell containing one or more points of the first point cloud;

for each point in the first point cloud, determine a point plane based on that point and one or more points in the first point cloud adjacent to that point;

measure a plurality of plane offset distances, the plurality of plane offset distances comprising, for each point in the first point cloud, one or more plane offset distances measured between the point plane corresponding to that point and one or more points in the second point cloud;

align the first and second point clouds based on the plurality of plane offset distances;

for each point in the second point cloud, calculate a normal direction based on that point and one or more points in the second point cloud adjacent to that point;

for each point in the aligned second point cloud, identify one or more corresponding points in the aligned first point cloud, the one or more corresponding points being located within a volume projected in the normal direction of that point; and generate a third point cloud comprising a third plurality of points corresponding to topographical differences between positions of corresponding points in the aligned first and second point clouds;

wherein the plurality of graphics processing cores execute parallel point processing based on the plurality of grid cells in at least one of said determining and said identifying steps.

12. The system of claim 11, wherein identifying the one or more corresponding points in the aligned first point cloud for each point in the aligned second point cloud comprises:
   identifying one or more grid cells that intersect with the projected volume; and
   for each identified grid cell, identifying one or more points in the aligned first point cloud within that grid cell that are within the projected volume.

13. The system of claim 11, wherein determining the point plane for each point in the first point cloud comprises:
   identifying one or more grid cells that are within a predetermined distance of that point; and
   for each identified grid cell, identifying one or more points in the first point cloud within that grid cell that are within the predetermined distance of that point as the one or more points adjacent to that point.

14. The system of claim 11, wherein aligning the first and second point clouds comprises:
   determining, for each point in the first point cloud, an associated point in the second point cloud based on one or more plane offset distances measured between the point plane corresponding to that point and one or more points in the second point cloud, wherein each point in the first point cloud is determined to be associated with a different point in the second point cloud; and
   aligning the first and second point clouds by minimizing plane offset distances of associated points in the first and second point clouds.

15. The system of claim 14, wherein aligning the first and second point clouds comprises:
   iteratively determining the associated points in the first and second point clouds and minimizing the plane offset distances of the associated points using an iterative closest point (ICP) algorithm.

16. The system of claim 11, wherein the projected volume has a capsule shape.

17. The system of claim 11, wherein the one or more processors further collectively execute instructions to:
   prior to determining the point plane for each point in the first point cloud, downsampling at least one of the first and second point clouds by removing at least some of the points in the respective point cloud.

18. The system of claim 11, wherein the one or more processors further collectively execute instructions to:
   prior to identifying the one or more corresponding points in the aligned first point cloud for each point in the aligned second point cloud, downsampling at least one of the aligned first and second point clouds by removing at least some of the points in the respective point cloud.

19. The system of claim 11, wherein the second point cloud comprises a greater number of points than the first point cloud.

20. The system of claim 11, wherein the second time period is subsequent to the first time period.

* * * * *